US007559560B2

(12) United States Patent
Li et al.

(10) Patent No.: US 7,559,560 B2
(45) Date of Patent: Jul. 14, 2009

(54) MAGIC ROLLATOR

(75) Inventors: Qingfeng Li, Foshan (CN); Sam Liang, Foshan (CN)

(73) Assignee: Genteel Homecare Products Co., Ltd., Foshan, Guangdong (CN)

( * ) Notice: Subject to any disclaimer, the term of this patent is extended or adjusted under 35 U.S.C. 154(b) by 389 days.

(21) Appl. No.: 11/444,202

(22) Filed: May 31, 2006

(65) Prior Publication Data

US 2007/0170699 A1 Jul. 26, 2007

(30) Foreign Application Priority Data

Jan. 26, 2006 (CN) .................... 2006 2 0054713 U

(51) Int. Cl.
*B62M 1/00* (2006.01)

(52) U.S. Cl. .................................. 280/87.021; 16/35 R

(58) Field of Classification Search .............. 280/47.11, 280/47.4, 47.34, 47.38, 87.05, 87.041, 639, 280/642, 647, 649, 650, 657, 658, 651; 16/18 R, 16/35 R, 87.021

See application file for complete search history.

(56) References Cited

U.S. PATENT DOCUMENTS 3,904,215 A * 9/1975 Bardy ................... 280/11.212
4,543,685 A * 10/1985 Kassai ........................ 16/35 R
4,637,093 A * 1/1987 Kassai ........................ 16/35 R
4,649,596 A * 3/1987 Kassai ........................ 16/35 R
4,907,794 A * 3/1990 Rose ........................... 482/68
5,112,044 A * 5/1992 Dubats ........................ 482/68
6,027,132 A * 2/2000 Robinson et al. ......... 280/250.1
6,099,002 A * 8/2000 Uchiyama .............. 280/87.021
6,296,263 B1 * 10/2001 Schultz et al. ......... 280/87.021
6,343,802 B1 * 2/2002 Workman et al. ...... 280/87.041
6,367,823 B1 * 4/2002 Miyagi .................... 280/47.34
6,419,319 B1 * 7/2002 Sakurai ................. 297/344.12

(Continued)

*Primary Examiner*—Christopher P Ellis
*Assistant Examiner*—Bridget Avery
(74) *Attorney, Agent, or Firm*—Charles E. Baxley

(57) ABSTRACT

The present utility model disclosed a main support frame, which has two bushings each set on the right and left side of said main support frame respectively; two supporting pipes, each inserted in one of the bushings of the main support frame; two P-shaped armrests, each connects with one of the supporting pipes; two pairs of front-wheel assembly and rear wheel assembly, each pair of front-wheel assembly and rear wheel assembly is connected with the main support frame; and a seat component comprising a seat body and a folding mechanism, said seat component can be folded in the middle and is set between the left side and right side of main support frame. Said folding mechanism consists of a first branch pipe and a second branch pipe, which hinge joint with each other in the middle, one end of the first branch pipe and the second branch pipe hinge joint with the left side and right side of the main support frame respectively, the other end connect with the two ends of said seat body respectively. The improvements of the magic rollator are that: the structure is simple, it is easy to be folded and the folded volume of it is small, it stands stably and is convenient for storing and transporting, the height of it is adjustable to meet the requirements of different users; the components of it are easy to be processed, the cost is low, meanwhile the components are assembled by bushing parts and jointed together by elastic blocking joints, it is unnecessary to use special tool to mount or dismount it, so it is suitable for customers to use.

8 Claims, 7 Drawing Sheets

U.S. PATENT DOCUMENTS 6,473,935 B1 * 11/2002 Cherukuri ...................... 16/33
6,484,359 B1 * 11/2002 Guttmann et al. ........... 16/18 R
7,108,004 B2 * 9/2006 Cowie et al. .................. 135/74
7,219,906 B2 * 5/2007 Hallgrimsson et al. . 280/87.041
7,306,246 B2 * 12/2007 Gale ....................... 280/87.05

* cited by examiner

MAGIC ROLLATOR

TECHNICAL FIELD

The present utility model relates to a rollator.

BACKGROUND ART

A rollator is made for the persons who have functional disorder in their lower limbs and who can not use crutches or canes. The main function of the rollator is to support people's weight and keep the body's balance, so as to help the users stand and walk. The rollator is classified into fixing-type and folding-type. For the convenience for the users to rest thereon, an integrated seat component is usually set in the rollator. Most of rollator according to existing art is adopted entad revolving type or lengthways folded type when closing it, it will take much space and the volume is too big for transporting. Moreover, the center of gravity of the rollator is not stable after folded, the manufacture cost of which is also very high.

SUMMARY

The objection of the utility model is to provide a magic rollator which has simple structure, small volume after folded, stands stably and is easy to be manufactured.

The technical solution of the utility model is: a magic rollator, including:

a main support frame, which has two bushings each set on the right and left side of said main support frame respectively;

two supporting pipes, each inserts in one of the bushings of the main support frame;

two P-shaped armrests, each connects with one of the supporting pipes;

two pairs of front-wheel assembly and rear wheel assembly, each pair of front-wheel assembly and rear wheel assembly is connected with the main support frame; and a seat component comprising a seat body and a folding mechanism, said seat component can be folded in the middle and is set between the left side and right side of main support frame.

Said folding mechanism consists of a first branch pipe and a second branch pipe, which hinge joint with each other in the middle, one end of the first branch pipe and the second branch pipe hinge joint with the left side and right side of main support frame respectively, the other end connect with the two ends of said seat body respectively.

Two ends of the seat body connect respectively with the first branch pipe and the second branch pipe of the folding mechanism. By folding the seat body in the middle, it drives the first branch pipe and the second branch pipe which hinge joint together to be closed. Then the bushings of the main support frame on both sides also close to the middle along with other components, and then it is folded. Since close the rollator symmetrically, the center of gravity of the rollator is stable and the volume is also small, so it is easy to be collected and transported. If open it, press the seat body, make the first branch pipe and the second branch pipe which hinge joint together to be open, it drives the corresponding bushings of main support frame to spread forward two sides, then spread the magic rollator.

As a preferred embodiment, one end of a first joint piece and a second joint piece hinge joint with said first branch pipe and the second branch pipe respectively, the other end of the first joint piece hinges joint with the right side of main support frame, the other end of the second joint piece hinges joint with the left side of main support frame. So that it can make the free ends of the first branch pipe and the second branch pipe hinge joint with the corresponding main support frame by joint pieces. The stability of the folding mechanism is improved, and the structure of the rollator is firmer when it is spread.

Aligning through holes are set symmetrically on the bushing of the main support frame, elasticity members which could be embedded in the aligning through holes are set on said supporting pipe.

Said elasticity member consists of steel balls and the springs between them, the steel balls can be embedded into said aligning through holes in different position so that the height of P-shaped armrest is adjustable to meet the requirements of different users.

The shape of the cross section of said bushing of the main support frame and the supporting pipe are ellipse, it is convenient for fixing the supporting pipe to prevent it rotating when it is used.

Said main support frame has a supporting main body with a shouldered hole, in which there sets a hollow fitting axle, one end of which is fixed in the supporting main body by an active buckle fitting, the other end of said fitting axle is connected to said front-wheel assembly. Said active buckle fitting consists of a button with splaying stop block mounted in said shouldered hole and the U-shaped snap spring with protruding member mounted in the hollow fitting axle, a block groove which is blocked into by the playing stop block is set on the supporting main body, the bottom of button connects with the top of the snap spring, said fitting axle has a long aperture, the protruding member of snap spring can be embed in the long aperture and extend into said shouldered hole. Insert the fitting axle and the front-wheel assembly into the supporting main body, when the protruding member of snap spring bounces out, the fixing of front-wheel is completed. The connection between the button and the snap spring is flexible. When taking down, press the button to compress the protruding member of snap spring, and then the front-wheel assembly can be taken down conveniently. In this way, the space could be further decreased for storing and transporting.

One end of said rear wheel assembly is insert in the main support frame and is fixed by a bolt and a bolt button matched with each other, or a pair of block perforations is set symmetrically on the main support frame, and elasticity members which can be embed in said block perforation are set on said rear wheel assembly. So the rear wheel assembly could be taken down rapidly, it is easy for storing and transporting.

The improvements of the rollator are that: the structure is simple, it is easy to be folded and the folded volume is small, it stands stably and is convenient for storing and transporting, the height of it is adjustable to meet the requirements of different users; the components of it are easy to be processed, the cost is low, meanwhile the components are fit by socketed way and jointed together elastically by blocked way, it is unnecessary to use special tool to dismount it, so it is suitable for customers to use.

Figure 1:
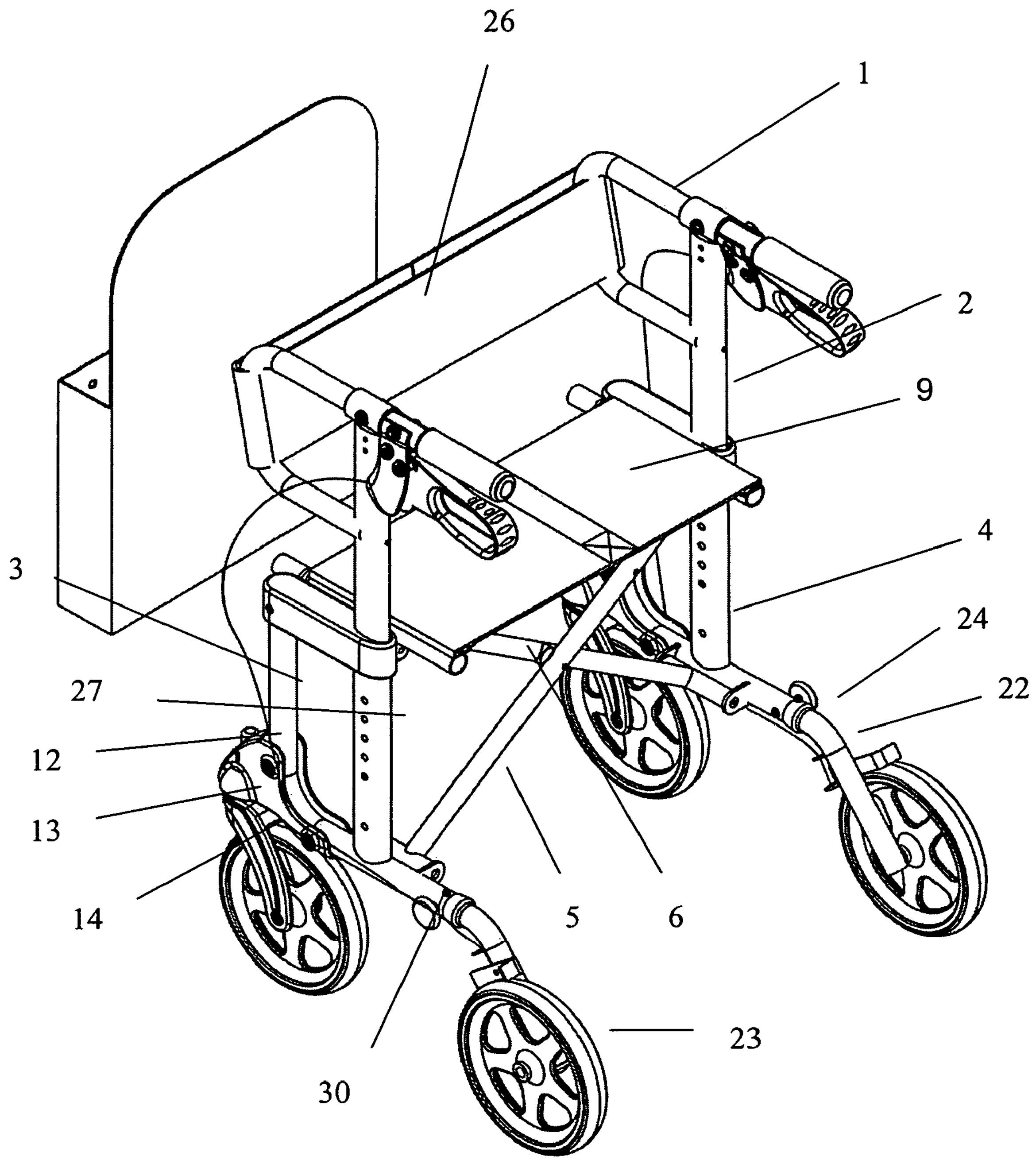
FIG. 1 is a perspective view of the magic rollator according to the utility model in the open state.

1. P-shaped armrest
2. supporting pipe
3. main support frame
4. bushing of the main support frame
5. the first branch pipe
6. the second branch pipe
7. the first joint piece
8. the second joint piece
9. seat component
10. steel ball
11. spring
12. button
13. supporting main body
14. front-wheel assembly
15. snap spring
16. fitting axle
17. shouldered hole
18. block groove
19. protruding member
20. long aperture
21. splaying stop block
22. rear wheel assembly
23. rear wheel
24. bolt knob
25. bolt
26. backrest
27. aligning hole
28. lift handle
29. block perforation
30. elasticity member

PREFERRED EMBODIMENTS

Figure 2:
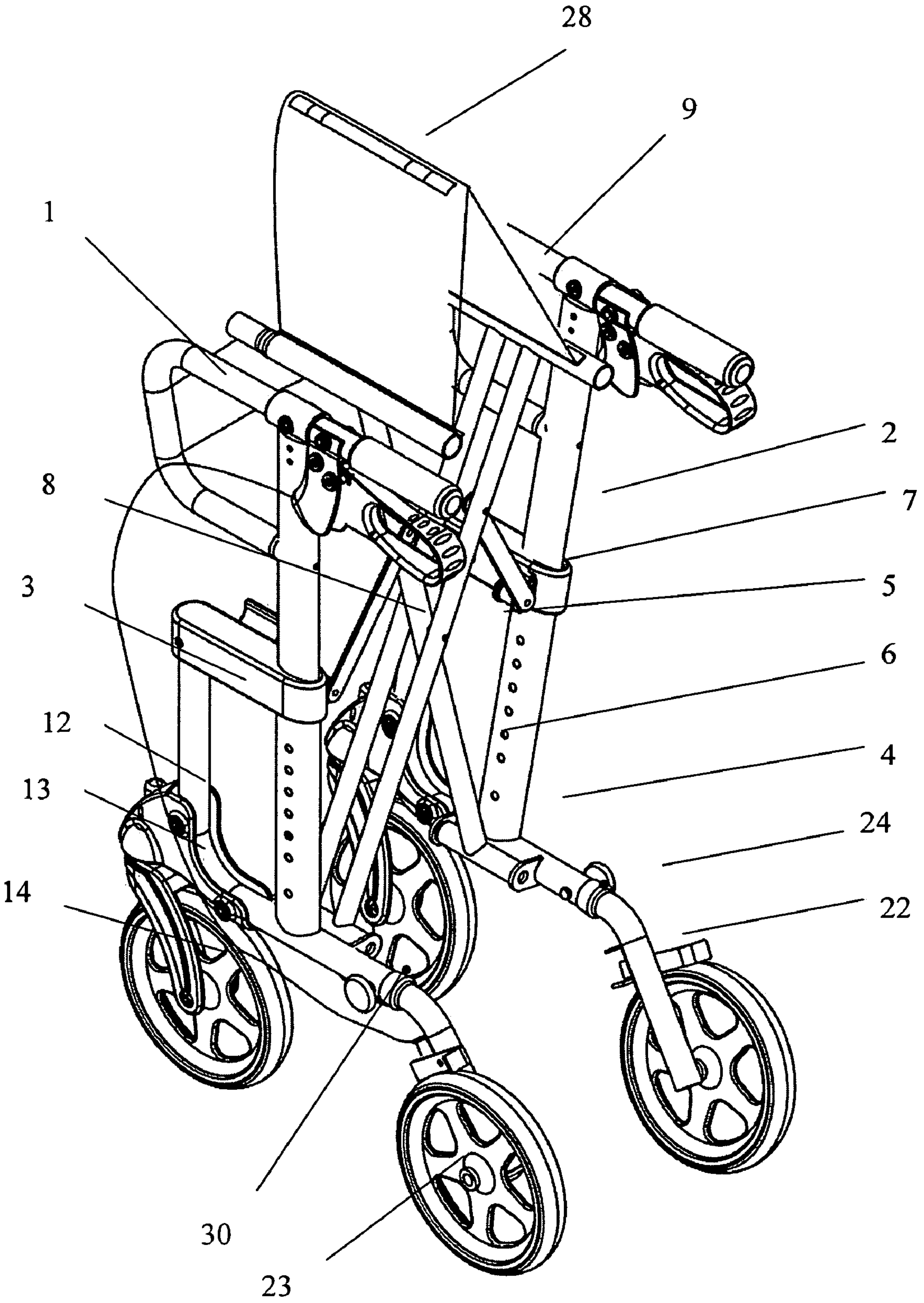
FIG. 2 is a perspective view of the magic rollator according to the utility model in the folded state.

Referring to FIGS. 1 and 2, a magic rollator, including: a main support frame 3, which has two bushings 4 each set on the right and left side of said main support frame 3 respectively; two supporting pipes 2, each inserts in one of the bushings 4 of the main support frame 3; two P-shaped armrests 1, each connects with one of the supporting pipes 2; two pairs of front-wheel assembly 14 and rear wheel assembly 22, each pair of front-wheel assembly and rear wheel assembly is connected with the main support frame 3; and a seat component 9 comprising a seat body and a folding mechanism, said seat component 9 can be folded in the middle and is set between the left side and right side of main support frame 3. The seat body may be made of canvas or other soft materials; a lift handle 28 is set in the middle, alternatively, it may also be made of firm material such as two pieces of plastic plate. A backrest 26 made of soft materials is mounted on the O form part of P-shaped armrest 1. Said folding mechanism consists of a first branch pipe 5 and a second branch pipe 6, which hinge joint with each other in the middle, one end of the first branch pipe 5 and the second branch pipe 6 hinge joint with the left side and right side of main support frame 3 respectively, the other end connect with the two ends of said seat body 9 respectively. One end of a first joint piece 7 and a second joint piece 8 hinge joint with said first branch pipe 5 and the second branch pipe 6, the other end of the first joint 7 piece hinges joint with the right side of main support frame 3, the other end of the second joint piece 8 hinges joint with the left side of main support frame 3. By folding the seat body 9 in the middle, it drives the first branch pipe 5 and the second branch pipe 6 which hinge joint together to be closed. Then the bushings 4 of the main support frame 3 on both sides also close to the middle along with other components so that it can be folded. Since it close symmetrically, the center of gravity of the rollator is stable and the volume is also small, so it is easy to be collected and transported. When open it, press the seat body 9, make the first branch pipe 5 and the second branch pipe 6 which hinge joint together to be open, it drives the corresponding bushings 4 of main support frame 3 to spread forward two sides, the ends of the first branch pipe 5 and the second branch pipe 6 that connects with the seat body 9 are respectively resist against the corresponding sides of bushings 4 of main support frame 3, then open the rollator. At the same time, the first joint piece 7 and the second joint piece 8 are also open, so that the corresponding first branch pipe 5 and the second branch pipe 6 strains, it makes the structure of the rollator more firm when it is spread and the stability also improved.

Figure 3:
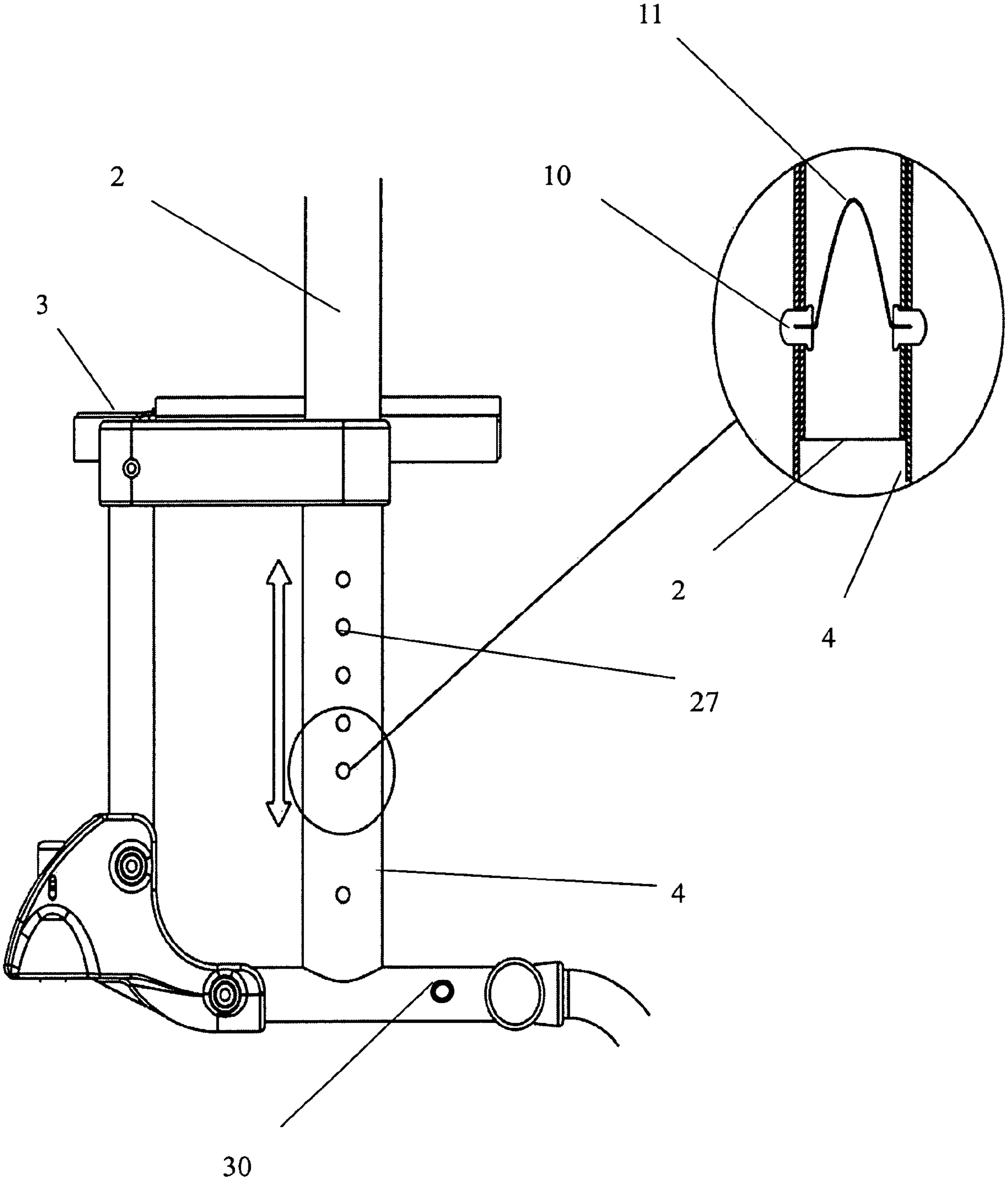
FIG. 3 is a schematic view illustrating the lifting and lowering mechanism of the magic rollator according to the utility model.

Referring to FIG. 3, aligning through holes 27 are set symmetrically on the bushing 4 of the main support frame 3; elasticity members which could be embedded in the aligning through holes 27 are set on said supporting pipe 2. Said elasticity member consists of steel balls 10 and the springs 11 between them, the steel balls 10 can be embedded into aligning through holes 27. so that the height of P-shaped armrest 1 is adjustable to meet the requirements of different users. The shape of the cross section of said bushing 4 of the main support frame 3 and the supporting pipe 2 are ellipse, it is convenient for fixing the supporting pipe to prevent from rotation when it is used.

Figure 4:
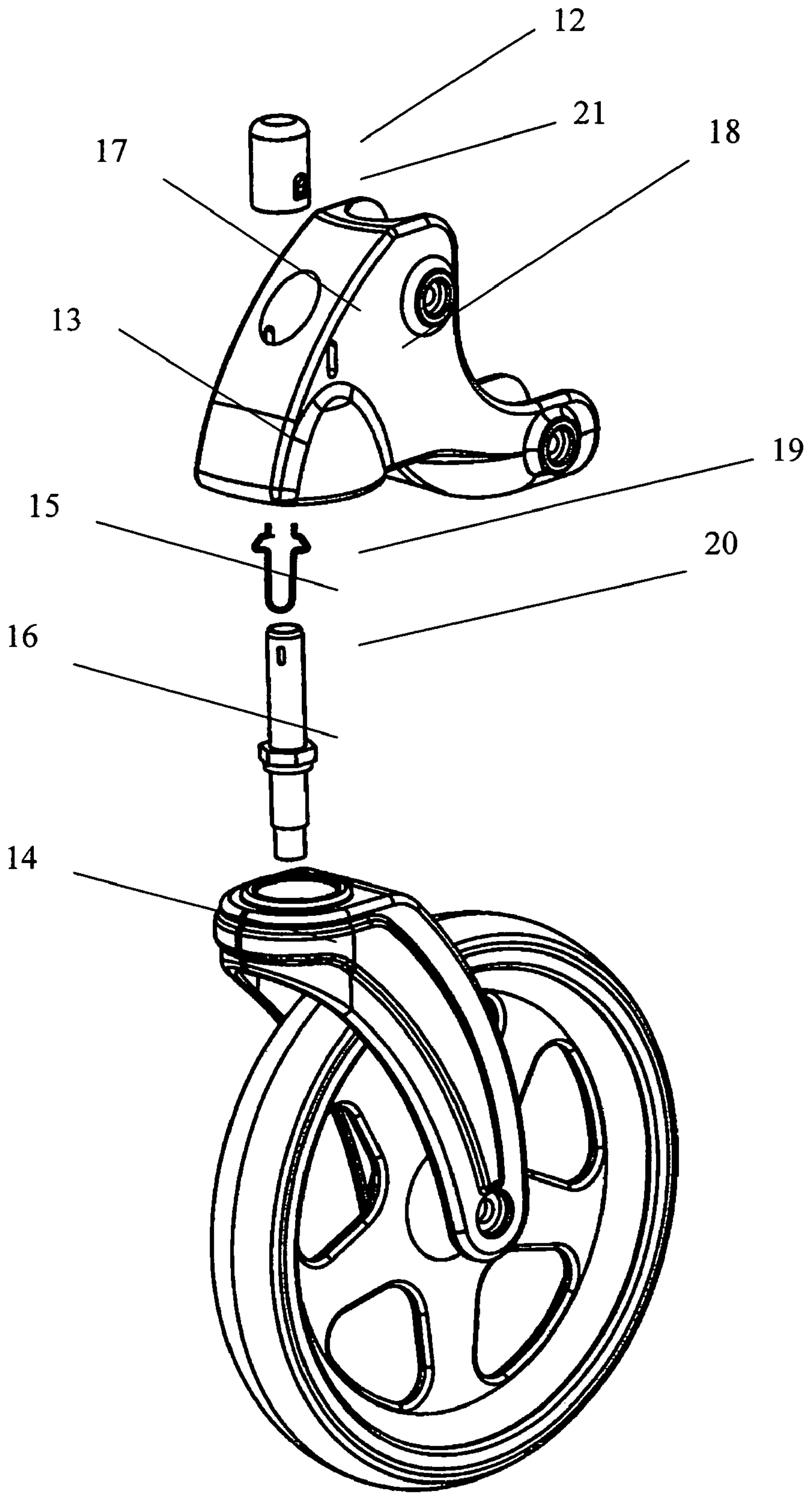
FIG. 4 is an exploded view of the front wheel assembly of the magic rollator according to the utility model.
Figure 5:
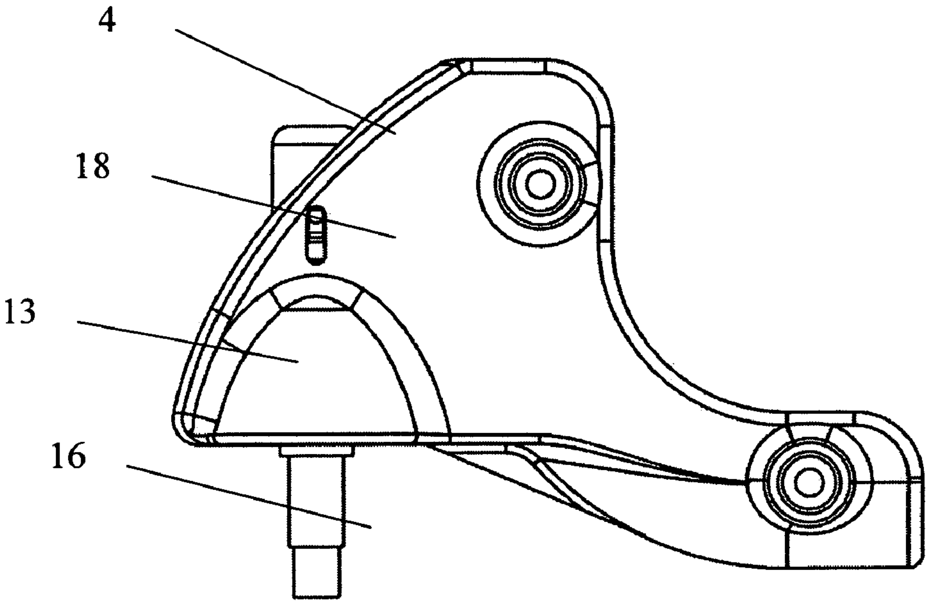
FIG. 5 is a side view of the supporting main body of the magic rollator according to the utility model.
Figure 6:
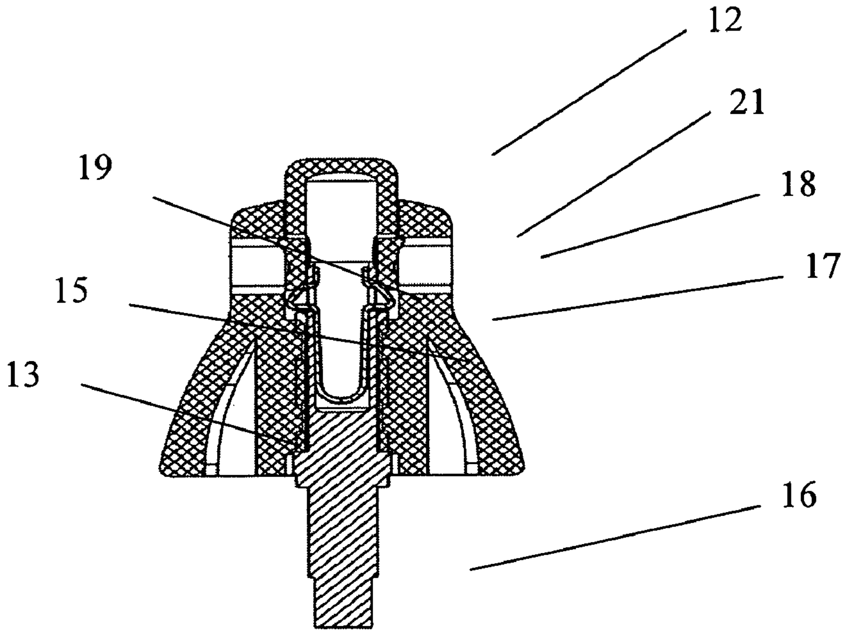
FIG. 6 is a sectional view of the supporting main body of the magic rollator according to the utility model.

Referring to FIGS. 4, 5 and 6, said main support frame 3 has a supporting main body 13 with a shouldered hole 17, in which there sets a hollow fitting axle 16, one end of which is fixed in the supporting main body 13 by an active buckle fitting, the other end of said fitting axle 16 is connected to said front-wheel assembly 14. Said active buckle fitting consists of the button 12 with a splaying stop block 21 mounted in said shouldered hole 17 and a U-shaped snap spring 15 with protruding member 19 mounted in the hollow fitting axle 16, a block groove 18 which is blocked into by the splaying stop block 21 is set on the supporting main body 13, the bottom of button 12 connects with the top of snap spring 15, said fitting axle 16 has a long aperture 20, the protruding member 19 of snap spring 15 can embed in the long aperture 20 and extend into said shouldered hole 17, and limits in it. Insert the fitting axle 16 and the front-wheel assembly 14 in the supporting main body 13, when the protruding member 19 of snap spring 15 bounces out, the fixing of front-wheel assembly 14 is completed. The connection between the button 12 and the snap spring 15 is flexible. When taking down it, press the button 12 to compress the protruding member 19 of snap spring 15, then the front-wheel assembly 14 can be released conveniently. In this way, the space could be further decreased for storing and transporting.

Figure 7:
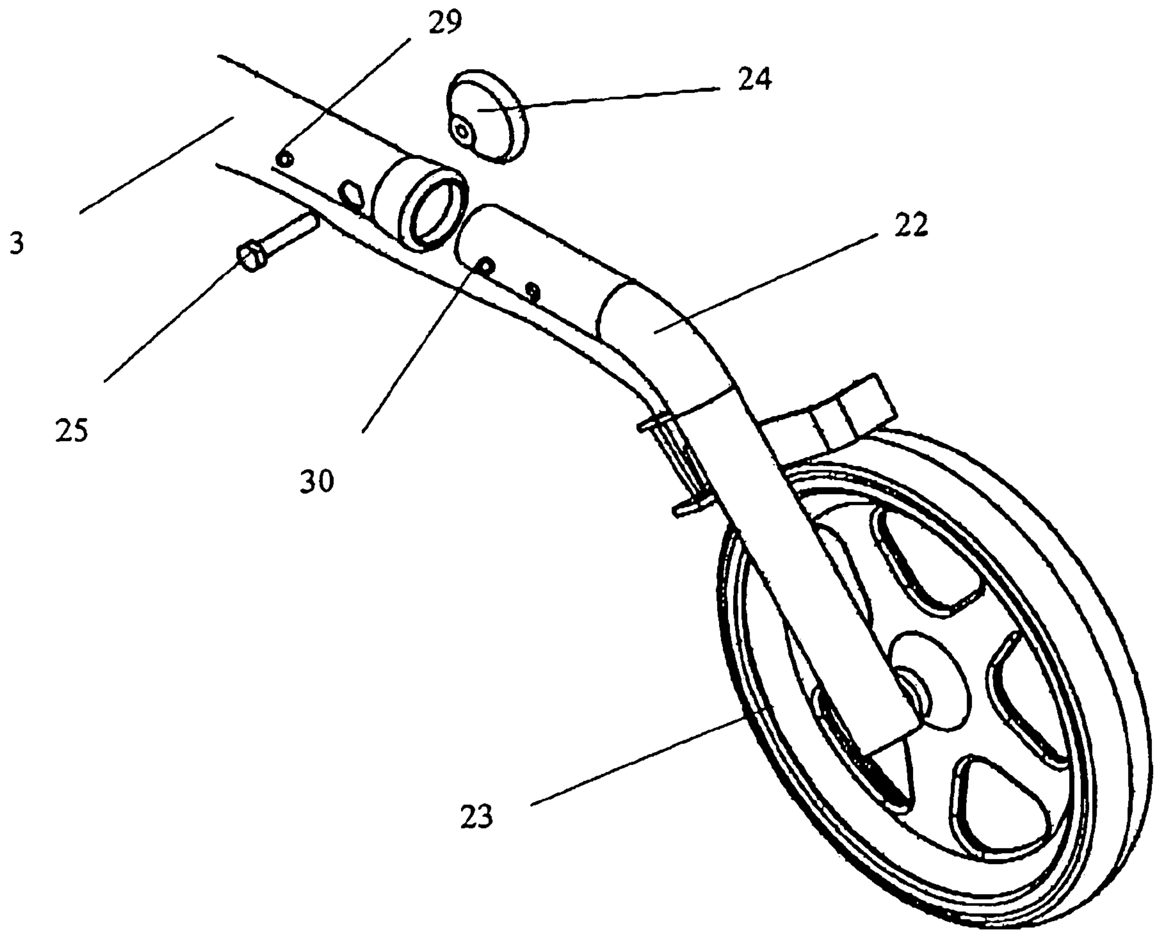
FIG. 7 is an exploded view of the rear wheel assembly of the magic rollator according to the utility model.

Referring to FIG. 7, one end of said rear wheel assembly 22 is inserted in the main support frame 3 and is fixed by a bolt 25 and a bolt knob 24 matched each other; at the same time a pair of block perforation 29 is set symmetrically on the main support frame 3, and elasticity members 30 which can be embedded in said block perforation 29 are set on said rear wheel assembly 22. These two kinds of fixing methods may be adopted separately, also may be adopted in the same time. So the rear wheel assembly 23 could be released rapidly, it is easy for storing and transporting.

Figure 8:
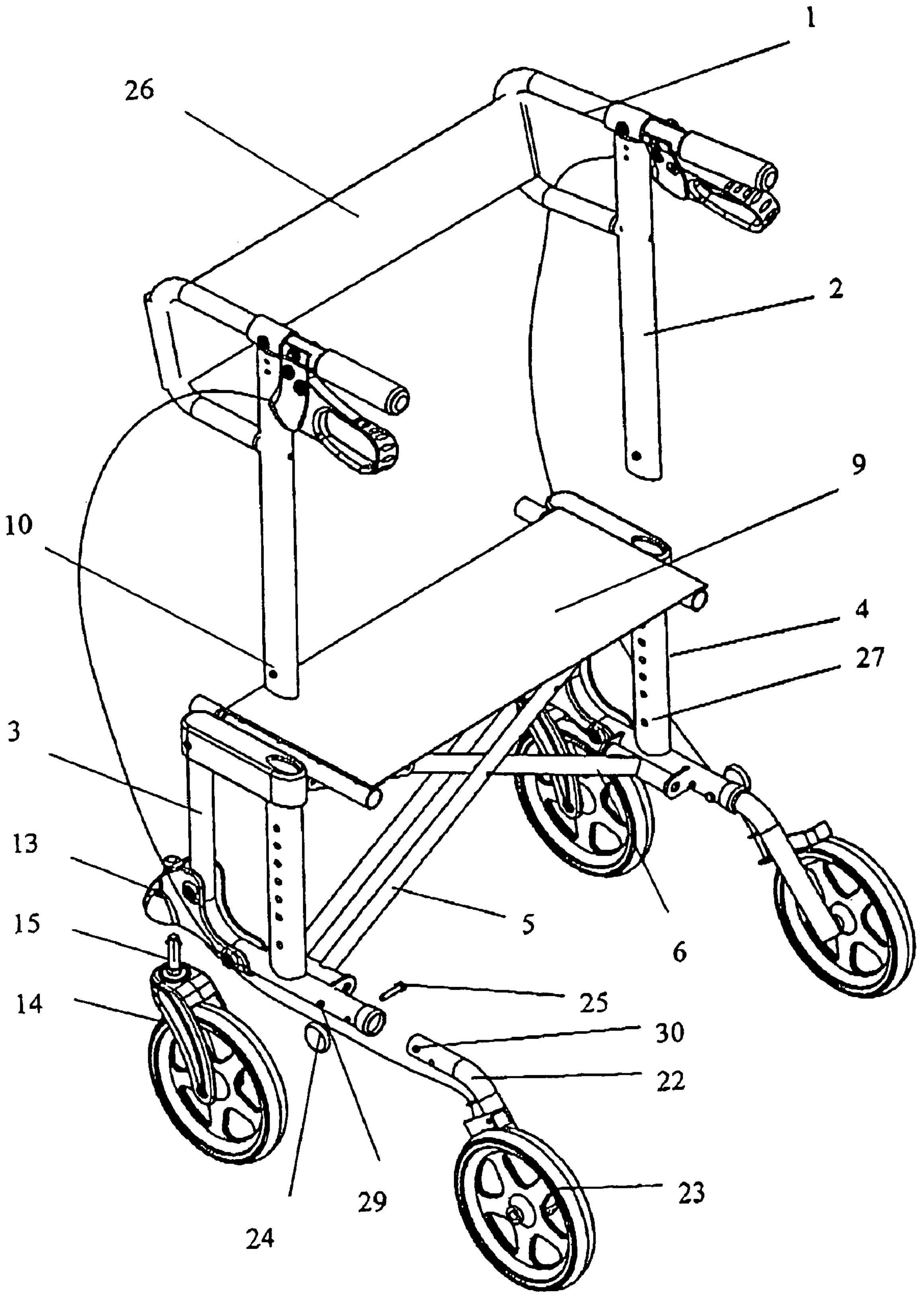
FIG. 8 is an exploded view of the magic rollator according to the utility model.

Referring to FIG. 8, the rollator according to the present utility model is set by socketed way and joined together by blocked way, thereof the supporting pipe 2 is inserted in the bushing 4 of the main support frame 3, and the orientation is carried out by matching steel balls 10 on it with orientation perforation on the bushing 4 of the main support frame 3. Moreover, the height of it can be adjustable. The front-wheel assembly 14 is set on the supporting main body 13 of the main support frame 3 by active buckle fitting; it is easy to be mounted and dismounted. The rear wheel assembly 22 is inserted in the main support frame 3 and is fixed by the bolt and the bolt button matched with each other; the backrest 26 between the P-shaped armrest 1 is made of soft material and is convenient for folding; The main support frame 3 has a folding mechanism, seat component 9 is also made of canvas which is also convenient for folding in the middle. When in production, the above components can be assembled in advance; the rollator can be assembled by the users without any special tool.

What is claimed:

1. A magic rollator, including:

a main support frame, which has two bushings each set on the right and left side of said main support frame respectively;

two supporting pipes, each inserts in one of the bushings of the main support frame;

two P-shaped armrests, each connects with one of the two supporting pipes;

a front wheel assembly including a pair of wheels and a rear wheel assembly including a pair of wheels, each pair of wheels is connected at the front or back of the main support frame; and a seat component comprising a seat body and a folding mechanism, said seat component can be folded in the middle and is set between the left side and right side of main support frame wherein said main support frame has a supporting main body with a shouldered hole, in which there sets a hollow fitting axle, one end of which is fixed in the supporting main body by an active buckle fitting, the other end of said fitting axle is connected to said front-wheel assembly, wherein said active buckle fitting consists of a button with a splaying stop block mounted in said shouldered hole and a U-shaped snap spring with protruding member mounted in the hollow fitting axle, a block groove which is blocked by the splaying stop block is set on the supporting main body, the bottom of the button connects with the top of the snap spring, said fitting axle has a long aperture, the protruding member of the snap spring is embedded in the long aperture and extends into said shouldered hole.

2. A magic rollator in accordance with claim 1 wherein said folding mechanism consists of a first branch pipe and a second branch pipe, which is hinged in the middle, one end of the first branch pipe and the second branch pipe being hinged with the left side and right side of the main support frame respectively, the other end being connected with the two ends of said seat body respectively.

3. A magic rollator in accordance with claim 1, wherein aligning through holes are set symmetrically on the bushing of the main support frame, elasticity members are embedded in the aligning through holes are set on said supporting pipe.

4. A magic rollator in accordance with claim 1 wherein one end of said rear wheel assembly is inserted in the main support frame, and is fixed by a bolt and a corresponding bolt knob.

5. A magic rollator in accordance with claim 1 wherein one end of said rear wheel assembly is inserted in the main support frame, a pair of block perforations are set symmetrically on the main support frame, elasticity members which can be embedded into said block perforation are set on said rear wheel assembly.

6. A magic rollator in accordance with claim 2, wherein one end of a first joint piece and a second joint piece being hinged with said first branch pipe and the second branch pipe respectively, the other end of the first joint piece being hinged with the right side of main support frame, the other end of the second joint piece being hinged with the left side of the main support frame.

7. A magic rollator in accordance with claim 3, wherein the shape of the cross section of the bushing of the main support frame and the supporting pipe is ellipse.

8. A magic rollator in accordance with claim 3, wherein the shape of the cross section of the bushing of the main support frame and the supporting pipe is ellipse.

* * * * *